United States Patent Office 3,803,175
Patented Apr. 9, 1974

3,803,175
PREPARATION OF COUMARIN COMPOUNDS
Allen K. Sparks, Des Plaines, and James J. Louvar, Evanston, Ill., assignors to Universal Oil Products Company, Des Plaines, Ill.
No Drawing. Continuation-in-part of abandoned application Ser. No. 852,493, Aug. 22, 1969. This application Aug. 17, 1971, Ser. No. 172,571
Int. Cl. C07d 7/26, 7/28
U.S. Cl. 260—343.2 R     11 Claims

ABSTRACT OF THE DISCLOSURE

Coumarin and substituted coumarin compounds are prepared by reacting an ethylenic compound with a hydroxy substituted aromatic compound in the presence of selected metallic compounds to form the desired products, said products possessing pleasant odors for use in cosmetic preparations.

CROSS REFERENCE TO RELATED APPLICATION

This application is a continuation-in-part of copending application Ser. No. 852,493, filed Aug. 22, 1969, now abandoned.

SPECIFICATION

This invention relates to a process for reacting a hydroxy substituted aromatic compound with an ethylenic compound in the presence of certain catalytic compositions of matter to form a polycyclic ketone containing an oxygen atom in one of the rings of the compound.

The products which are prepared according to the process of this invention are useful in the chemical industry and particularly the aroma industry. Heretofore, many of the compounds which are used in the aroma industry for the preparation of fragrance or aroma compositions which are added to cosmetic and toiletry articles such as perfumes, colognes, soaps, talcs, bath powders, etc., have been naturally occurring compounds or have been derived from naturally occurring vegetable sources such as flowers, roots, bushes, trees, etc., or natural animal sources such as the musk-ox, civet, etc. However, the sources for these aroma chemicals are subject to the whims and vagaries of nature such as drought, floods, heat, unseasonable changes in climate, scarcity of game, etc. Therefore, the amount of these naturally occurring sources was uncertain and the compounders of the finished aroma compositions of matter could not be assured of a constant supply to meet the demands and requirements of the industry. However, in the past several years materials which possess identical odors and fragrances have been prepared in a synthetic manner thereby assuring a constant supply of the desired compounds.

It has now been discovered that compounds comprising polycyclic ketones containing an oxygen atom on one ring, the other ring being aromatic in nature, may be prepared according to the process of the present invention which is hereinafter set forth in greater detail. A specific example of this is coumarin which is also known as benzopyrone and which has heretofore been isolated from Tonka beans. Coumarin is an important compound which possesses a fragrant odor similar to that of vanilla, said coumarin being used as a deodorizing and odor enhancing agent as well as being used in perfumes, soaps, tobacco, inks, rubber, pharmaceutical preparations and other products where aromatic ingredients are required.

It is therefore an object of this invention to provide a novel process for preparing polycyclic ketones containing an oxygen atom in one of the rings.

A further object of this invention is to provide a process for preparing a coumarin compound utilizing certain catalytic compositions of matter to effect the reaction.

In one aspect an embodiment of this invention resides in a process for the preparation of a coumarin which comprises reacting an ethylenic compound with a hydroxy substituted aromatic compound in the presence of a compound containing a catalyst of Group VIII of the Periodic Table, and recovering the resultant coumarin.

A specific embodiment of this invention is found in a process for preparing a coumarin which comprises reacting phenol with methyl acrylate in the presence of palladium acetate in an acetic acid solvent and recovering the resultant coumarin.

Other objects and embodiments will be found in the following further detailed description of the present invention.

As hereinbefore set forth the present invention is concerned with a process for preparing polycyclic ketones containing an oxygen atom in one of the rings. The aforementioned compounds are prepared by reacting a hydroxy substituted aromatic compound with a second compound containing an ethylenic linkage, said reaction being effected if so desired, in an inert organic solvent and in the presence of a metal-containing compound. As a second embodiment thereof, it is also contemplated within the scope of this invention that the process may also be effected in a catalytic manner in the presence of a catalyst of the type hereinafter set forth in greater detail and in the presence of an oxygen-containing gas.

Examples of hydroxy substituted aromatic compounds which may be employed as one of the compounds in the present process will possess the generic formula:

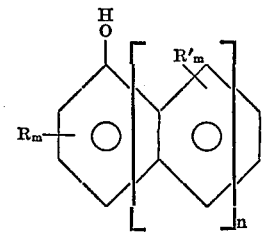

in which R and R' are independently selected from the group consisting of hydrogen hydroxyl, alkyl, alkoxy, aryl, alkaryl, aralkyl, cycloalkyl, and halogen (preferably chlorine) radicals, $m$ is an integer of from 1 to 4, and $n$ is an integer of from 0 to about 2. Specific examples of these compounds which may be employed will include phenol, o-cresol, m-cresol, p-cresol,
o-ethylphenol, m-ethylphenol, p-ethylphenol,
o-propylphenol, m-propylphenol, p-propylphenol,
o-isopropylphenol, m-isopropylphenol,
p-isopropylphenol, o-t-butylphenol, p-t-butylphenol,
m-t-butylphenol, o-methoxyphenol, p-methoxyphenol,
m-methoxyphenol, o-ethoxyphenol, m-ethoxyphenol,
p-ethoxyphenol, o-propoxyphenol, m-propoxyphenol,
p-propoxyphenol, o-phenylphenol, m-phenylphenol,
p-phenylphenol, o-benzylphenol, m-benzylphenol,
p-benzylphenol, o-(o-tolyl)phenol, m-(o-tolyl)phenol,
p-(o-tolyl)phenol, o-(p-tolyl)phenol, m-(p-tolyl)phenol,
p-(p-tolyl)phenol, o-cyclopentylphenol,
m-cyclopentylphenol, p-cyclopentylphenol, o-cyclohexylphenol,
m-cyclohexylphenol, p-cyclohexylphenol,
o-chlorophenol, m-chlorophenol,
p-chlorophenol, 1-hydroxynaphthalene,
2-hydroxynaphthalene,
1-hydroxy-3-methylnaphthalene,
1-hydroxy-4-methylnaphthalene, 1-hydroxy-3-ethylnaphthalene,
1-hydroxy-4-ethylnaphthalene,
1-hydroxy-3-propylnaphthalene,
1-hydroxy-4-propylnaphthalene,
1-hydroxy-3-methoxynaphthalene,
1-hydroxy-4-methoxynaphthalene,
1-hydroxy-3-ethoxynaphthalene,
1-hydroxy-4-ethoxynaphthalene,
1-hydroxy-3-phenylnapthalene,
1-hydroxy-4-phenylnaphthalene,
1-hydroxy-3-p-tolyl-naphthalene,
1-hydroxy-4-p-tolyl-naphthalene,
1-hydroxy-3-benzylnaphthalene,
1-hydroxy-4-benzylnaphthalene,
1-hydroxy-3-cyclopentylnaphthalene,
1-hydroxy-4-cyclopentylnaphthalene,
1-hydroxy-3-cyclohexylnaphthalene,
1-hydroxy-4-cyclohexylnaphthalene,
1-hydroxy-3-chloronaphthalene,
1-hydroxy-4-chloronaphthalene, the corresponding anthracenes, etc.

The aforementioned aromatic compounds are reacted with an ethylenic compound which possesses the generic formula:

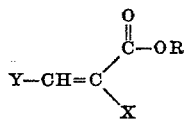

in which R is selected from the group consisting of hydrogen, alkyl or cycloalkyl radicals and X and Y are selected from the group consisting of hydrogen, alkyl, cycloalkyl, aryl, aralkyl or alkaryl radicals. Some specific examples of these compounds which contain an ethylenic linkage will include acrylic acid, methyl acrylate, ethyl acrylate, propyl acrylate, isopropyl acrylate, cyclopentyl acrylate, cyclohexyl acrylate, phenyl acrylate, benzyl acrylate, p-tolyl acrylate, α-methylacrylic acid, α-ethyl-acrylic acid, α-phenylacrylic acid, methyl α-methacrylate, ethyl α-methacrylate, propyl α-methacrylate, cyclohexyl α-methacrylate, benzyl α-methacrylate, phenyl α-methacrylate, crotonic acid, methyl crotonate, ethyl crotonate, propyl crotonate, cyclopentyl crotonate, cyclohexyl crotonate, phenyl crotonate, benzyl crotonate, p-tolyl crotonate, cinnamic acid, methyl cinnamate, ethyl cinnamate, propyl cinnamate, cyclohexyl cinnamate, phenyl cinnamate, benzyl cinnamate, α-methylcinnamic acid, α-ethylcinnamic acid, α-propylcinnamic acid, α-phenylcinnamic acid, α-cyclohexylcinnamic acid, α-benzylcinnamic acid, methyl α-methylcinnamate, ethyl α-methylcinnamate, propyl α-methylcinnamate, phenyl α-methylcinnamate, benzyl α-methylcinnamate, etc. It is to be understod that the aforementioned aromatic compound and compounds containing an ethylenic linkage are only representative of the class of compounds which may be utilized as starting materials, and that the present invention is not necessarily limited thereto.

The reaction between the hydroxy substituted aromatic compound and the ethylenic compound of the types hereinbefore set forth in greater detail is effected in the presence of a composition of matter comprising a metal or a salt of a metal of Group VIII of the Periodic Table. In the preferred embodiment of this invention, salts of these metals comprise the alkylcarboxylates and acetylacetonates. Specific examples of these salts will include platinum acetate, platinum acetylacetonate, palladium acetate, palladium propionate, palladium acetylacetonate, rhodium acetate, rhodium acetylacetonate, ruthenium acetate, ruthenium acetylacetonate, osmium acetate, osmium acetylacetonate, iridium acetate, iridium acetylacetonate, nickel acetate, nickel acetylacetonate, etc. In addition, if so desired, the reaction is effected in an organic solvent, preferably alkyl carboxylic acids containing from two to about five carbon atoms, such as acetic acid, propionic acid, butyric acid, pivalic acid, etc.

In addition, it is also contemplated within the scope of this invention that the reaction may be effected in a catalytic manner. When such a modification of the process is utilized, the reaction may be carried out using a catalytic amount of a transition metal or a salt thereof, said metal being selected from the group consisting of copper, cobalt, nickel, iron, manganese, chromium, vanadium, titanium, tin, antimony, and mercury, the preferred salts being the acetates and acetylacetonates thereof. Specific examples of these salts include copper acetate, copper acetylacetonate, silver acetate, cobalt acetate, cobalt acetylacetonate, nickel acetate, nickel acetylacetonate, iron acetate, iron acetylacetonate, manganese acetate, manganese acetylacetonate, chromium acetate, chromium acetylacetonate, vanadium acetate, vanadium acetylacetonate, titanium acetate, titanium acetylacetonate, tin acetate, tin acetylacetonate, antimony acetate, antimony acetylacetonate, mercury acetate, and mercury acetylacetonate.

The reaction conditions under which this reaction is effected will include temperatures ranging from about ambient (about 25° C.) to about 250° C. or more. In addition, if so desired, the reaction is effected in the presence of an oxygen-containing gas such as oxygen or air, the latter being preferred due to the greater availability and lower cost thereof. The reaction pressures which will be used will range from about atmospheric to about 500 atmospheres, the pressure being supplied by the oxygen-containing gas. However, it is contemplated within the scope of this invention that the oxygen-containing gas may only afford a partial pressure of the desired reaction pressure, the remainder of the pressure being provided for by the introduction of a substantially inert gas such as nitrogen into the reaction zone.

The process of this invention may be effected in any suitable manner and may comprise either a batch or continuous type operation. For example, when a batch type operation is used a quantity of the hydroxy substituted aromatic compound and the ethylenic compound are placed in an appropriate apparatus along with the metal or salt of the metal of the type hereinbefore set forth. In addition, if so desired, an organic solvent such as acetic acid and the catalyst comprising a transition metal or a salt thereof are also placed in the apparatus. This apparatus may, in the preferred embodiment of the invention, comprise an autoclave of the rotating or mixing type. The autoclave is sealed, and oxygen-containing gas is charged thereto and the apparatus is then heated to the desired operating temperature. After maintaining the autoclave at the desired temperature and pressure for a predetermined residence time which may range from 0.5 up to about 48 hours or more in duration heating is discontinued. The apparatus and contents thereof are allowed to return to room temperature, the excess pressure is vented and the reaction product is recovered. The product is then subjected to conventional means of separation and purification such as filtration to separate the metal and/or the metal salt followed by washing with water, drying over sodium sulfate, evaporation, fractional crystallization, fractional distillation, etc., whereby the desired product comprising an aromatic compound containing a substituent possessing an ethylenic linkage is recovered.

Examples of polycyclic ketones containing an oxygen atom in one of the rings which may be prepared according to the process of this invention will include coumarin, 3-methylcoumarin, 4-methylcoumarin, 5-methylcoumarin, 6-methylcoumarin, 7-methylcoumarin, 8-methylcoumarin, 3-ethylcoumarin, 4-ethylcoumarin, 5-ethylcoumarin, 6-ethylcoumarin, 7 - ethylcoumarin, 8 - ethylcoumarin, 3-propylcoumarin, 4-propylcoumarin, 5-propylcoumarin, 6-propylcoumarin, 7-propylcoumarin, 8-propylcoumarin, 3-isopropylcoumarin, 4 - isopropylcoumarin, 5 - isopropylcoumarin, 6-isopropylcoumarin, 7-isopropylcoumarin, 8-isopropylcoumarin, 3-t-butylcoumarin, 4-t-butylcoumarin, 5-t-butylcoumarin, 6-t-butylcoumarin, 7-t-butylcoumarin, 8-t-butylcoumarin, 3-methoxycoumarin, 4-methoxycoumarin, 5-methoxycoumarin, 6-methoxycoumarin, 7-methoxycoumarin, 8-methoxycoumarin, 3-ethoxycoumarin, 4-ethoxycoumarin, 5-ethoxycoumarin, 6-ethoxycoumarin, 7-ethoxycoumarin, 8-ethoxycoumarin, 3-phenylcoumarin, 4-phenylcoumarin, 5-phenylcoumarin, 6-phenylcoumarin, 7-phenylcoumarin, 8-phenylcoumarin, 3-benzylcoumarin 4-benzylcoumarin 5-benzylcoumarin, 6-benzylcoumarin, 7-benzylcoumarin, 8-benzylcoumarin, 3-cyclohexylcoumarin, 4-cyclohexylcoumarin, 5-cyclohexylcoumarin, 6-cyclohexylcoumarin, 7 - cyclohexylcoumarin, 8 - cyclohexylcoumarin, 3-chlorocoumarin, 4-chlorocoumarin, 5-chlorocoumarin, 6-chlorocoumarin, 7-chlorocoumarin, 8-chlorocoumarin, 3,6-dimethylcoumarin, 6,7-dimethylcoumarin, 5,6-dimethylcoumarin, etc. It is to be understood that the aforementioned compounds are only representative of the class of organic ketones containing an oxygen atom in one of the rings which may be prepared according to the process described herein, and that the present invention is not necessarily limited thereto.

The following examples are given to illustrate the process of the present invention which, however, are not intended to limit the generally broad scope of the present invention in strict accordance therewith.

EXAMPLE I

A mixture comprising 3.00 moles of phenol, 3.00 moles of acetic acid, 0.024 mole of cupric acetate monohydrate, and 0.003 mole of palladium (II) acetate along with 6 g. of a diatomaceous earth and 0.600 mole of methyl acrylate was placed in a stainless steel autoclave provided with a mechanical stirrer, provision for the introduction and discharge of gases and a system for condensing vapor. The autoclave was sealed and air was bubbled into the reactants at a rate of about two cubic feet per hour while maintaining the pressure inside the autoclave at 250 pounds per square inch. At this point, rapid stirring and heating were begun and the reaction was allowed to proceed for 6 hours at a temperature of 90° C. At the end of this time the stream of air was discharged and nitrogen was charged to the autoclave at a rate of two cubic feet per hour while maintaining the temperature at 90° C. and the pressure at 250 pounds per square inch. The nitrogen was allowed to pass through the reactants for a period of 1 hour. At the end of the 1 hour period, the autoclave was cooled to room temperature and the stream of nitrogen flow was halted, the excess pressure was discharged, the autoclave was unsealed and the product removed therefrom. The reaction product was subjected to filtration to remove the solid product consisting mainly of palladium metal absorbed on the diatomaceous earth plus some cupric acetate. The liquid product was subjected to gas-chromatographic analysis which indicated the presence of coumarin, methyl o-hydroxycinnamate and methyl p-hydroxy-cinnamate along with some unreacted phenol and methyl acrylate. The data confirmed a 67% conversion of the methyl acrylate with a 49% selectivity to coumarin and methyl o-hydroxycinnamate (a coumarin precursor), and a 31% selectivity to methyl p-hydroxycinnamate.

Following this, the mixture of coumarin, methyl o-hydroxycinnamate, methyl p-hydroxycinnamate, and any other components present may be heated to a temperature in the range of 200° C. to 250° C. for a period of 3 hours to convert the methyl o-hydroxycinnamate to coumarin. The coumarin may then be separated from any remaining p-hydroxycinnamate by fractional distillation.

EXAMPLE II

Using an apparatus similar to that described in Example I above, 3.00 moles of phenol, 1.73 moles of propionic acid, 0.012 mole of cupric acetate monohydrate, 0.006 mole of palladium (II) acetate, 1.20 moles of methyl acrylate and 6 g. of a diatomaceous earth were reacted at a temperature of 90° C. and a pressure of 250 pounds per square inch which was provided for by the charge of air to the autoclave at a rate of about two cubic feet per hour for a period of 6 hours. At the end of the 6 hour period, the autoclave was purged with nitrogen in a manner similar to that set forth in Example I above, the autoclave was then cooled to room temperature, the excess pressure discharged and the reaction product recovered therefrom. After separation from the solid catalyst by filtration, the liquid product was subjected to a gas-chromatographic analysis which disclosed a 59% conversion of the methyl acrylate with a 46% selectivity to coumarin and methyl o-hydroxycinnamate, along with 21% selectivity into methyl p-hydroxycinnamate.

EXAMPLE III

In this example, a mixture of 3.00 moles of phenol, 3.00 moles of acetic acid, 0.06 mole of cupric acetate monohydrate, 0.006 mole of palladium (II) acetylacetonate and 0.600 mole of methyl acrylate was placed in a 1 liter, 3-necked, glass flask equipped with a mechanical stirrer, air sparger and a reflux condenser. The mixture was reacted at a temperature of 69° C. for a period of 7 hours as a stream of air at atmospheric pressure was passed through the reactants at a rate of 2 cubic feet per hour. Upon completion of the desired reaction time, the liquid product was recovered and subjected to a gas-chromatographic analysis. This analysis disclosed a 65% conversion of methyl acrylate with 57% selectivity to coumarin and methyl o-hydroxycinnamate along with a 24% selectivity to methyl p-hydroxycinnamate.

EXAMPLE IV

In this example a mixture of 3.00 moles of phenol, 3.00 moles of acetic acid, 0.012 mole of cupric acetate monohydrate, 0.012 mole of palladium (II) acetylacetonate, 0.600 mole of acrylic acid and 2 g. of internal standard consisting of methyl hexyl ketone was reacted in a stirred, stainless-steel autoclave at a temperature of 90° C. for a period of 2.3 hours utilizing a reaction pressure of 1100 pounds per square inch. The pressure was provided for by the introduction of air passing through the reactor at a rate of 1 cubic foot per hour. At the end of the aforementioned time period the passage of air through the autoclave was discontinued and the autoclave was purged utilizing a stream of nitrogen as the purging agent. The autoclave was then allowed to return to room temperature, the excess pressure was discharged, the autoclave was opened and the reaction mixture was recovered therefrom. After separation from the catalyst, the liquid product was subjected to a gas chromatographic analysis which disclosed a 96% conversion of acrylic acid. The major product comprised coumarin.

EXAMPLE V

In this example, a mixture comprising 0.500 mole of p-tert-butylphenol, 0.500 mole of acetic acid, 0.001 mole of cupric acetate monohydrate, 0.001 mole of palladium (II) acetylacetonate, 0.100 mole of methyl acrylate and 2 g. of an internal standard consisting of methyl hexyl ketone were reacted in a stirred, stainless-steel autoclave at a temperature of 120° C. for a period of 8 hours under 1000 pounds per square inch of air. At the end of the 8 hour period, the autoclave was again purged utilizing a stream of nitrogen as the purging agent, allowed to return to room temperature, the excess pressure was discharged and the autoclave was opened. The reaction product was recovered from the autoclave to remove the catalyst and subjected to analysis. The analysis disclosed a 99.5% conversion of methyl acrylate with a 38% selectivity to 6-tert-butylcoumarin.

EXAMPLE VI

A mixture consisting of 3 moles of p-cresol, 3 moles of acetic acid, 0.02 mole of cupric acetate monohydrate, 0.003 mole of palladium acetylacetonate, and 0.6 mole of acrylic acid is placed in a stainless-steel autoclave. The autoclave is sealed and air is bubbled through the reactants at a rate of about 2 cubic feet per hour while maintaining the internal pressure at about 250 pounds per square inch. The mixture is stirred and the autoclave is heated to a temperature of 90° C. The autoclave and contents thereof are maintained at this temperature for a period of 6 hours, at the end of which time, the introduction of air is halted and nitrogen is charged to the reactor for an additional period of 1 hour under the same conditions of temperature and pressure. Following this, the autoclave is cooled to room temperature, the excess pressure is discharged and the products are removed. The solid product is separated from the liquid product by filtration and the latter is then subjected to analysis. This analysis will show the presence of the desired product comprising 6-methylcoumarin.

EXAMPLE VII

In this example a mixture comprising 3 moles of 3,4-dimethylphenol, 3 moles of acetic acid, 0.06 mole of cupric acetate monohydrate, 0.6 mole of acrylic acid and 0.006 mole of palladium acetate are placed in a 1 liter 3-necked glass flask provided with a stirrer, air sparger and reflux condenser. The mixture is reacted at a temperature of 70° C. for a period of 6 hours while passing air at atmospheric pressure through the reactants at a rate of 2 cubic feet per hour. At the end of the 6 hour period, heating is discontinued, the charging of air is also discontinued and the reactor is allowed to return to room temperature. The solid product is separated from the liquid product and the latter is subjected to analysis. This analysis will disclose the presence of the desired product comprising 6,7-dimethylcoumarin, together with some 5,6-dimethylcoumarin.

EXAMPLE VIII

A mixture comprising 62.5 g. (0.655 mole) of phenol, 7.2 g. (0.10 mole) of acrylic acid, 30 g. (0.5 mole) of acetic acid, 2.0 g. of n-dodecane, and 2.48 g. (0.01 mole) of nickel acetate is placed in the glass liner of a rotating autoclave. The liner is sealed into the autoclave and nitrogen is pressed in until an initial pressure of 10 atmospheres is reached. The autoclave and contents thereof are heated to a temperature of 120° C. and maintained thereat for a period of 4 hours. At the end of this time the autoclave and contents thereof are allowed to cool to room temperature, the excess pressure is discharged, and the autoclave is opened. The reaction mixture is recovered and filtered to remove the catalyst. Following this the filtrate is washed with water, dried over sodium sulfate, and subjected to evaporation to remove the acetic acid. The desired product comprising coumarin is recovered by means of fractional distillation.

We claim as our invention:

1. A process for the preparation of a coumarin which comprises reacting an ethylenic compound which possesses the generic formula:

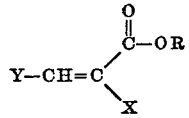

in which R is selected from the group consisting of hydrogen, lower alkyl or $C_5$–$C_6$ cycloalkyl radicals and X and Y are selected from the group consisting of hydrogen, lower alkyl $C_5$–$C_6$ cycloalkyl, phenyl, benzyl and tolyl radicals, with a hydroxy substituted aromatic compound which possesses the generic formula

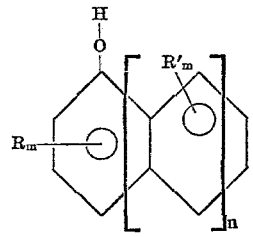

in which R and R' are independently selected from the group consisting of hydrogen, hydroxyl, lower alkyl, lower alkoxy, phenyl, benzyl, tolyl, $C_5$–$C_6$ cycloalkyl, and halogen radicals, $m$ is an integer of from 0 to 4, and $n$ is an integer of from 0 to 2 in the presence of a Group VIII metal alkylcarboxylate or acetylacetonate.

2. The process as set forth in claim 1 in which said process is effected in the presence of a substantially inert organic solvent.

3. The process as set forth in claim 1 which said process is effected in the presence of an oxygen-containing gas.

4. The process as set forth in claim 3 in which said process is effected in the presence of a catalyst comprising a salt of a metal selected from the group consisting of copper, silver, cobalt, nickel, iron, manganese, titanium, tin, vanadium, chromium, antimony and mercury.

5. The process as set forth in claim 1 in which said compound containing a metal of Group VIII of the Periodic Table is palladium acetylacetonate.

6. The process as set forth in claim 1 in which said compound containing a metal of Group VIII of the Periodic Table is palladium acetate.

7. The process as set forth in claim 1 in which said ethylenic compound is acrylic acid, said hydroxy substituted aromatic compound is phenol and said coumarin is coumarin.

8. The process as set forth in claim 1 in which said ethylenic compound is acrylic acid, said hydroxy substituted aromatic compound is p-cresol and said coumarin is 6-methylcoumarin.

9. The process as set forth in claim 1 in which said ethylenic compound is methyl acrylate, said hydroxy substituted aromatic compound is phenol and said coumarin is coumarin.

10. The process as set forth in claim 1 in which said ethylenic compound is acrylic acid, said hydroxy substituted aromatic compound is 3,4-dimethylphenol and said coumarin is 6,7-dimethylcoumarin.

11. The process as set forth in claim 1 in which said ethylenic compound is methyl acrylate, said hydroxy substituted aromatic compound is p-t-butylphenol and said coumarin is 6-t-butylcoumarin.

References Cited

UNITED STATES PATENTS

| | | | |
|---|---|---|---|
| 2,421,837 | 6/1947 | Hardman | 260—465 F |
| 2,704,766 | 3/1955 | Nordt et al. | 260—343.2 |
| 2,789,995 | 4/1957 | Johnston | 260—465 F |
| 3,282,938 | 11/1966 | Ritter et al. | 260—343.2 |
| 3,527,794 | 9/1970 | Heck | 260—476 |

JOHN M. FORD, Primary Examiner

U.S. Cl. X.R.

252—522